E. H. BRISTOL.
MEASURING INSTRUMENT.
APPLICATION FILED MAR. 3, 1913.
1,283,395.
Patented Oct. 29, 1918.
3 SHEETS—SHEET 1.
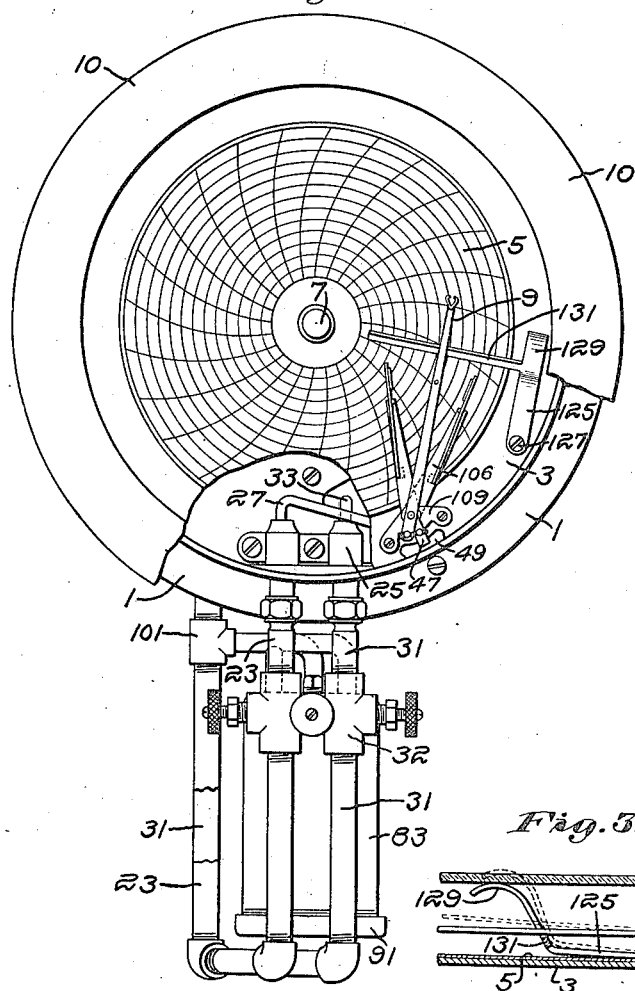
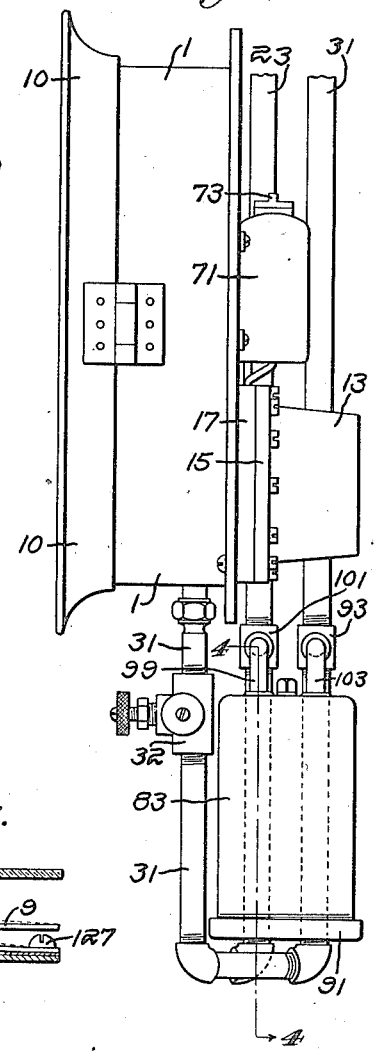
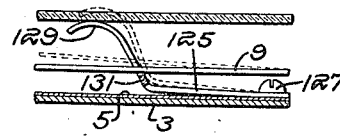
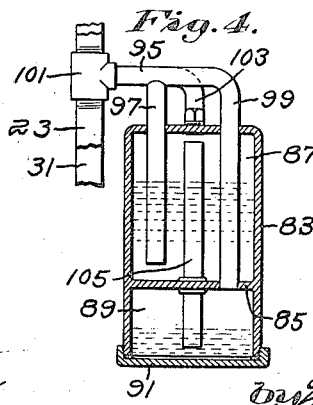
Witnesses:
Carl L. Choate
Horace A. Crossman
Inventor:
Edgar H. Bristol,
by Emery, Booth, Janney & Varney
Attys.

E. H. BRISTOL.
MEASURING INSTRUMENT.
APPLICATION FILED MAR. 3, 1913.
1,283,395.
Patented Oct. 29, 1918.
3 SHEETS—SHEET 2.
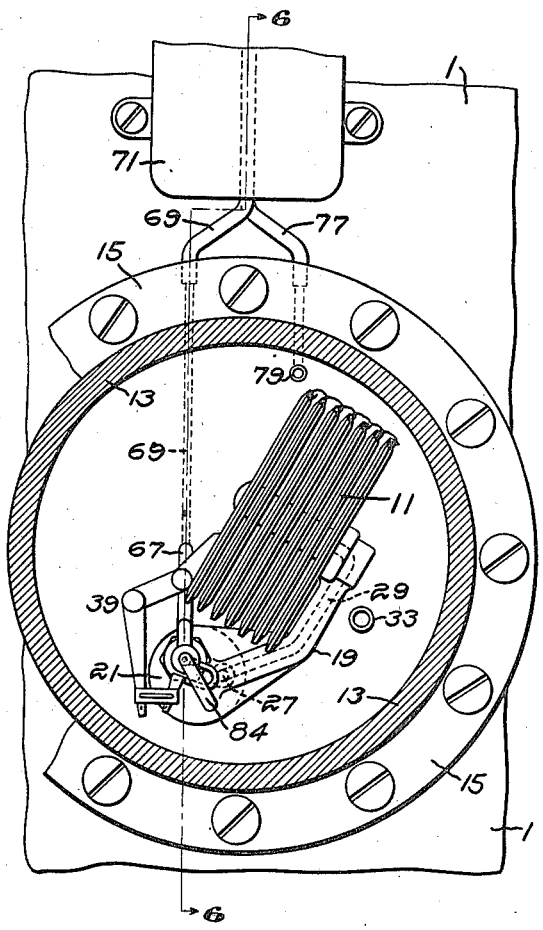
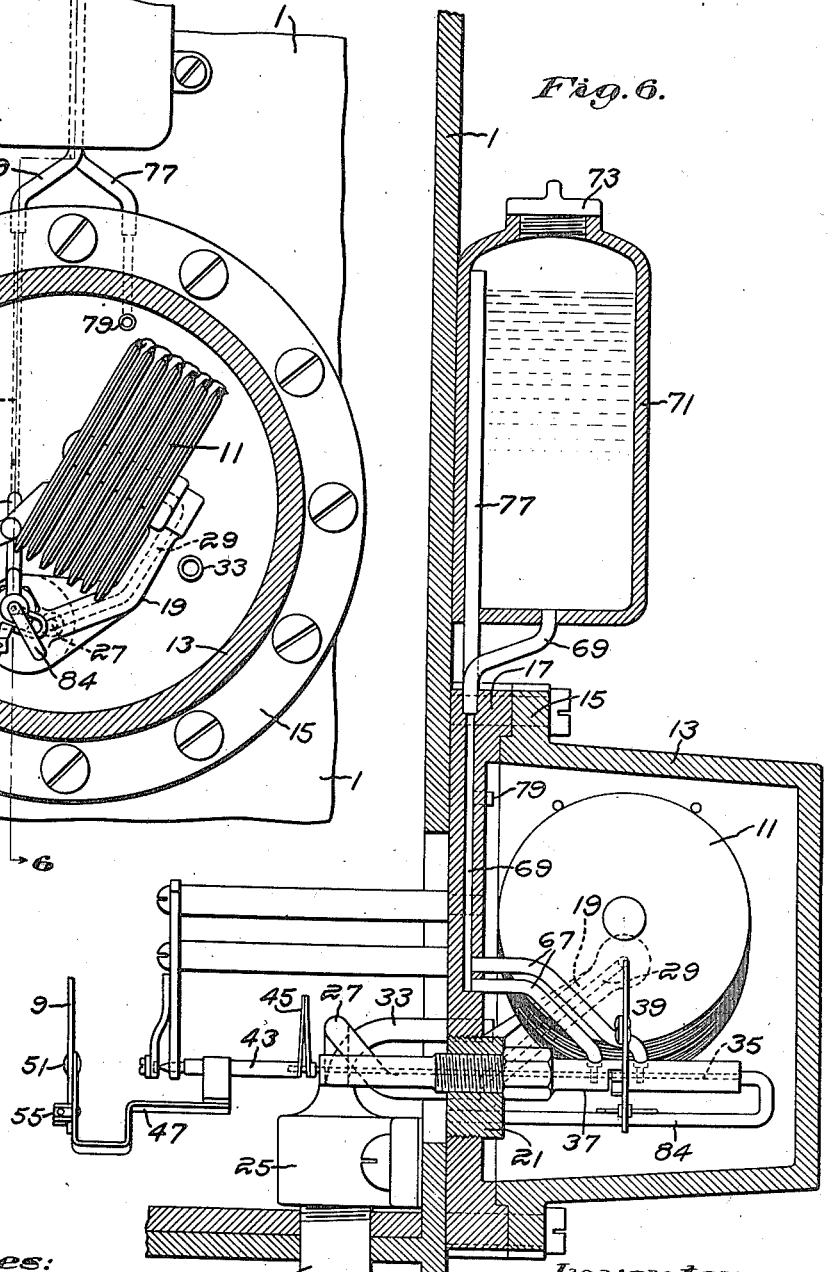
Witnesses:
Carl L. Choate.
Horace A. Groseman
Inventor:
Edgar H. Bristol,
by Emery, Booth, Janney & Varney
Attys.

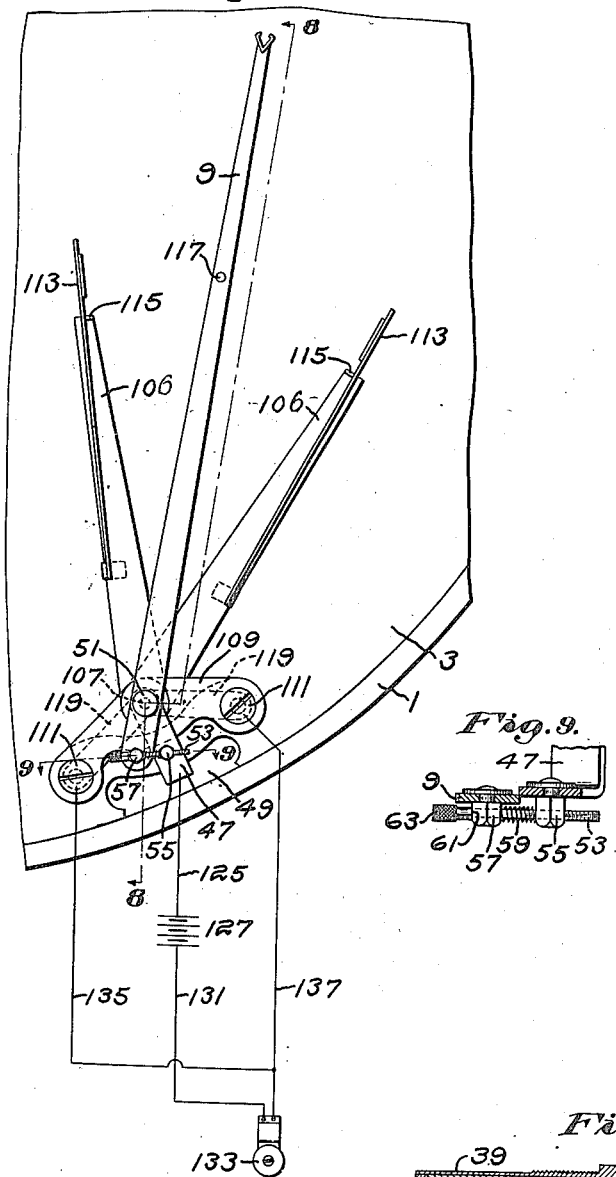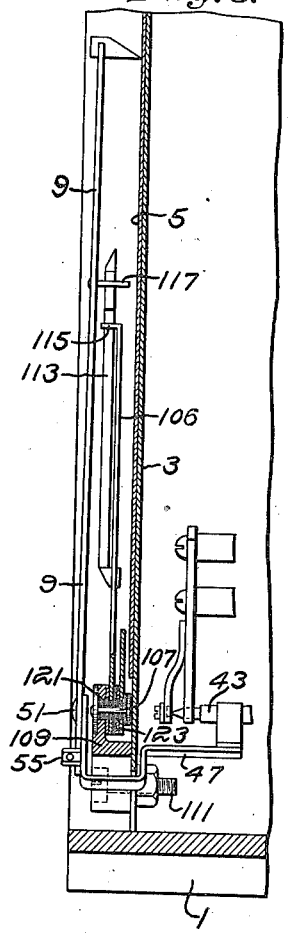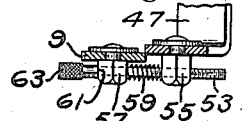

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

1,283,395.      Specification of Letters Patent.      Patented Oct. 29, 1918.

Application filed March 3, 1913. Serial No. 751,729.

*To all whom it may concern:*

Be it known that I, EDGAR H. BRISTOL, a citizen of the United States, and a resident of Foxboro, in the county of Norfolk and Commonwealth of Massachusetts, have invented an Improvement in Measuring Instruments, of which the following description, in connection with the accompanying drawings, is a specification, like characters on the drawings representing like parts.

This invention relates to instruments for indicating and recording pressures, temperature and the like.

As shown herein, the invention is embodied in a pressure responsive instrument for indicating and recording differential pressures.

The character of the invention may be best understood by reference to the following description of an illustrative embodiment thereof shown in the accompanying drawings, wherein:

Figure 1 is a front elevation of an illustrative gage embodying the invention, with a portion of the face of the gage broken away to display mechanism back of said face;

Fig. 2 is a side elevation of Fig. 1;

Fig. 3 on an enlarged scale is a detail of an index lifting device shown in Fig. 1;

Fig. 4 is a vertical section taken on line 4—4 of Fig. 2;

Fig. 5 on an enlarged scale is a vertical section through a part of the pressure responsive mechanism shown in Fig. 2;

Fig. 6 is a section taken on line 6—6 of Fig. 5;

Fig. 7 on an enlarged scale is a plan of a signal device shown in Fig. 1;

Fig. 8 is a section taken on line 8—8 of Fig. 7;

Fig. 9 on an enlarged scale is a section taken on line 9—9 of Fig. 7; and

Fig. 10 is a detail of a shaft and bearing construction to be referred to.

Referring to the drawing, the illustrative instrument there shown as embodying the invention comprises a casing 1 (Figs. 1 and 2) in which is fixed a circular plate 3 adapted to receive and support a chart 5 graduated radially to represent periods of time and circularly to represent any desired pressures or other units or scales of values, said chart being detachably secured to and rotated by a shaft 7 driven by a suitable clock mechanism (not shown) contained in the said casing. An index or pointer shown herein as a pen index 9 is movable over said chart and may be caused to travel in a generally radial direction over said chart to indicate or record thereon a pressure prevailing at or during any instant or period of time. The casing is provided with a cover 10 hinged thereto and containing a glass through which said chart and index are readily visible.

To control the movement of the index there is provided pressure responsive means typified herein as an expansion tube 11. (Figs. 5 and 6) composed of a series of expansible sections or diaphragms adapted to be elongated or contracted by variation of pressure. An expansion tube of the general character disclosed herein is shown in Letters Patent No. 420,570 granted to W. H. Bristol February 4, 1890.

The tube 11 is mounted and inclosed within a chamber formed by a casing 13 having a flange 15 detachably secured to a base plate 17 by suitable screws, said base plate in turn being secured to the rear face of the chart and clock containing casing 1 referred to. To support the expansion tube within said casing there is provided an elbow arm 19 projecting laterally and upwardly from a plug 21 threaded in an aperture in the plate 17.

Pressure may be admitted to the interior of the tube 11 by a pipe 23 entered into the casing 1 and threaded to a union bracket 25 secured to the rear wall of said casing. To conduct pressure thence to the expansion tube 11 there is provided a small tube 27 having one end appropriately connected to said union and its opposite end connected to said plug 21. The tube supporting arm is provided with a bore 29 communicating with the tube 27 and with the interior of the expansion tube 11.

Pressure may be admitted to the interior of the casing 13 by a pipe 31 also connected to the union bracket 25 and connected by a small pipe 33 with the interior of said casing.

To control the admission of fluid to the pipes 23 and 31 there may be provided a fitting 32 having passages and three needle valves.

To transmit movements of the expansion tube to the index 9 referred to, there is provided an elongated shaft 35 (Figs. 6 and 10) contained in an elongated bearing 37 extending from within said expansion tube casing into the chart and index containing casing. This bearing may be carried by and extend through the elbow arm supporting plug 21 and be threaded thereto. Appropriate connections such as 39 may be provided for connecting the expansion tube 11 to the shaft 35 for transmitting movement from the former to the latter substantially as shown and described in my copending application, Serial No. 741,198 filed January 10, 1913.

An important feature of the invention relates to the construction of the elongated bearing 37. In certain uses the difference in pressure in the expansion tube 11 and casing 13 is extremely slight. As a result, the presence of friction between the shaft 35 and its bearing 37 may appreciably affect and prevent the faithful transmission of the differential pressure by the shaft to the index. To reduce the friction between the shaft and its bearing to a minimum the bearing may comprise a thin shell 39 of brass or other suitable material having at one end a plug 41 separate from or integral with said tube as desired. This plug is provided with a bore corresponding to the diameter of the shaft. The long needle-like shaft 35 is of nickel or other suitable material. This shaft is introduced into the sleeve 39 with one end projecting through the plug 41. The other end is then centered within the sleeve by any suitable device and the annular space formed between the shaft and the shell is filled by the pouring of molten tin or other suitable metal into the open end of the shell. To prevent the adhesion of the shaft to the tin the former may be given a coating of carbon in the form of soot or other lubricant as desired. The tin has a lower melting point and is softer than either the steel shaft or the brass shell. As a result, it will not injure either, but will fill the space between the shaft and sleeve and conform thereto. After the tin bearing filler has solidified the shaft may be removed and the soot wiped therefrom. A bearing is thus produced having a conformity to the shaft and so fitting the latter that the shaft may turn without play in its bearing, but with a minimum friction.

The pressure within the casing 13 is frequently very high although the differential pressure is small. This high pressure tends to cause the plate 17 to belly or bulge more or less. Since the shaft is offset from the center of the plate, this bulging would tend to cause the elongated bearing 37 to tilt from a position perpendicular to said plate. The expansion tube supporting arm and the elongated shaft are connected at substantially the same point to the plug 21. As a result, any tilting of the shaft will be shared by a corresponding tilting of the arm and there will be no relative displacement of the tube and the shaft. This is important since such displacement might tend to create a rotative movement of the shaft other than that caused by normal expansion and contraction of the tube from differential pressures.

One end of the shaft 35 projects somewhat beyond the bearing 37 and may be connected to a short shaft 43 by flexible arm connections 45 as shown in my said copending application. To connect this short shaft with the index there is provided an arm 47 (Figs. 6, 7 and 8) projecting from said shaft through an aperture 49 (Fig. 1) in the chart supporting plate 3, referred to, and having a free end to which the index 9 is pivotally connected by a pin 51. Means is provided to permit the index to be adjusted relatively to said arm in order that its arc of travel may parallel and conform to the radial graduations of the chart. To this end the index is pivoted to the pin 51 at a point somewhat removed from an end of the index and an adjusting screw 53 is provided (Fig. 9) having a portion threaded in a nut 55 on a stud entered through said arm 47 and a smooth portion occupying a bore in a similar nut 57 carried by the index. Interposed between said nuts 55 and 57 and encircling the adjusting screw is a spring 59 tending to slide the nut 57 along the screw away from the nut 55. This movement is limited by a shoulder 61 on the screw. To facilitate the adjustment of the screw it may have a knurled head 63. The turning of the screw 53 will cause the short arm of the index to be rocked relatively to its supporting arm 47 more or less to vary the angle of the path of travel of the index pen. The spring 59 maintains the arms in proper relation without any lost motion.

To maintain equal pressures on opposite ends of the shaft 35 there may be provided a goose neck tube 84 having one end connected to the bearing 37 and its opposite end entered in the bearing carrying plug 21 to communicate with the interior of the casing 1 as shown in my said copending application.

An important feature of the construction shown relates to the provision of means for supplying oil or other suitable lubricant to the elongated shaft 35. To this end the bearing 37 is bored transversely as at 65 (Fig. 10) at points on opposite sides of the point of connection of the shaft with the expansion tube connections. These bores are connected by pipes 67 (Fig. 6) with a duct 69 in the casing plate 17, referred to, said duct in turn being connected by a pipe 69 with an oil reservoir 71 conveniently mounted on the rear of the casing 1. This reservoir may be filled through a neck at its top provided with an appropriate stopper 73. The presence of pressure within the casing 13 acting on the exposed portion 75 (Fig. 10) of the shaft 35, would tend to oppose the feeding of the oil to the shaft. To equalize the pressure on the shaft at this point and the pressure on the surface of the oil supply there is provided a pipe 77 in said reservoir extending above the surface thereof, said pipe having a lower end communicating with a bore in the plate 17 parallelling the bore 69 referred to and communicating with the interior of the casing 13 through a lateral inlet 79. By this construction it will be apparent that the same pressure may be maintained on the surface of the oil as exists within the casing 13. As a result, the oil may freely feed from the reservoir to the shaft as required and thereby continuously maintain the same properly lubricated. The reservoir is of such size that it requires but infrequent filling so that the shaft will be properly oiled for long periods without attention. The maintenance of oil around the shaft has a further advantage, in that it assists in preventing leakage between the shaft and its bearing. This construction is more fully described and is claimed in my copending application Serial No. 212,556, filed Jan. 19, 1918.

It is desirable to provide means for preventing an excessive differential pressure such as might expand or contract the pressure responsive tube 11 beyond its elastic limit. I will now describe a device for automatically equalizing the pressures within the expansion tube and casing in the event that the differential pressure reaches a predetermined limit. This device comprises a casing 83 (Figs. 1, 2 and 4) divided by a partition 85 into an upper chamber 87 and a lower chamber 89. One end of the casing may be closed by a cap 91 threaded thereto. The chambers 87 and 89 contain mercury or other suitable liquid, the depth of the mercury in the upper chamber being preferably considerably greater than the depth of the mercury in the lower chamber.

The expansion tube, pressure admission pipe 23 is provided with a T-union 101 (Fig. 2) to which is connected a pipe 95 having two branches 97 and 99. The branch 97 extends through the top of the casing 83 down into the chamber 87 to within a short distance from the bottom of said chamber, while the branch 99 extends through the chamber 87 and the partition 85 and communicates with the lower chamber 89.

The casing, pressure admission pipe 31 is provided with a T-union 93 connected by a pipe 103 with the upper chamber 87. The chambers are placed in communication by a pipe 105 projecting above the liquid in the upper chamber 87 nearly to the top of the latter and projecting through the partition 85 down a substantial distance beneath the level of the liquid in the lower chamber 89 and nearly to the bottom of the latter. The depth of the liquid contained in the branch pipe 97 is proportioned to the range of pressure indicating movement of the index 9. In order to have a differential pressure it is necessary that the pressure in the tube should be greater than the pressure in the casing or vice versa. For purposes of illustration it may be supposed that the pressure within the expansion tube is the higher pressure. In such case the branch pipe 97 containing the column of liquid proportional to the range of movement of the index should be in communication with the high pressure expansion tube.

In operation the greater pressure in the expansion tube will cause the liquid column within the pipe 97 to fall and fluctuate in accordance with the differential pressure. In the event that the differential pressure is sufficient to overcome the column, the latter will be forced by the pressure of the gas back of it down and entirely out of the pipe. Then the gas will be free to bubble up through the liquid contained in the chamber 87 to the surface thereof and escape into the low pressure pipe 103 and thence escape to the responsive tube containing casing. This will automatically equalize the pressures in said tube and casing and prevent the expansion of the tube beyond its elastic limit.

In preventing the contraction of the expansion tube beyond its elastic limit, the pressure within the chamber is transmitted through the pipe 103 into the space above the liquid in the chamber 87 and thence down through the pipe 105 to the chamber 89. This will cause the liquid contained in the lower end of the pipe 105 to fluctuate in accordance with the differential pressure, but in the event that the pressure of the gas reaches a predetermined point the liquid will be forced down out of the pipe 105, thereby permitting the gas to bubble up through the liquid contained in the chamber 89 and above the surface of said liquid. Thence it escapes up through the pipe 99 to the expansion tube and as a result equalizes the pressures within and without the tube and prevents undue contraction of the tube.

The device described for equalizing the pressures when their difference equals a predetermined amount is extremely simple in construction and operation. One particular advantage thereof is that it is effective in equalizing the pressures immediately on their reaching the predetermined difference. This is due to the fact that as soon as the liquid columns are forced from the pipes 97 and 105 the gaseous fluid immediately commences to bubble up through the liquid in the chambers.

A feature of the invention relates to the provision of a signal or alarm for automatically calling attention to the predetermined pressures. As shown herein, this device comprises a pair of divider-like arms 106 (Figs. 1 and 7) having superposed ends pivoted on a bracket 109 on the chart supporting plate 3 referred to by screw 111. These arms are provided with resilient contact fingers 113 having ends soldered or otherwise secured thereto and outer free ends projecting beyond the ends of said arms. Said fingers are limited in one direction by stop shoulders 115 on said arms 106, but are free to yield and bend outwardly away from said shoulders on the engagement therewith of a pin 117 projecting from the index 9.

The arms 106 are provided at their pivot ends with conducting strips 119 apertured to receive the fulcrum pin 107 and the bracket screws 111. To insulate one of the arms 106 and its conducting strip 119 from the other arm and its conducting strip, the fulcrum pin 107 is incased in a sleeve 121 (Fig. 8) of insulation material and said arms 106 are separated by a washer 123 of insulation material.

The index arm 47 is connected by a wire 125 (Fig. 7) with a battery 127 or other suitable source of electricity, said battery being connected by a wire 131 with a signal typified herein as an electric bell 133 although any other appropriate signal may be used if desired. The bell is connected by a wire 135 with one of the bracket screws 111 and by a wire 137 with the other screw 111.

When the index swings outward toward its limit of maximum pressure the pin 117 engages one of the contact fingers 113. This completes the circuit and causes the bell to sound. When the index swings inward toward its limit of minimum pressure the pin 117 engages the other contact finger 113 and again closes the circuit and causes the bell to sound. This notifies the attendant that an observation of the gage should be made.

The contact carrying arms 106 are held in different positions of adjustment by the friction on their pivot and may be set to produce a signal at any limit desired.

The contact fingers 113 are light and freely flexible and offer but slight opposition to any excess movement of the index which may occur after the sounding of the signal.

The contact carrying arms 106 may be set if desired to signal the automatic equalizing of the pressures by the equalizing device or may be set to signal any other pressure desired.

In taking out and replacing charts from the gage it is necessary to lift the index up from engagement with the chart. To do this automatically there may be provided an arm 125 (Figs. 1 and 3) having one end secured by a screw 127 to the chart carrying plate 3 and its other end portion bent up and arched as at 129 for engagement with the inner face of the cover glass. The arm is provided with a laterally projecting finger 131 projecting radially toward the center of the chart beneath the index. When the casing cover 10 is closed the glass thereof depresses the arm 125 from its dotted position to its full line position (Fig. 3) and lowers the finger 131 out of engagement with the index. On the opening of the glass for the purpose of substituting a new chart for an old one the inherent resiliency of the arm 125 causes the same in the course of this opening movement to spring up to its dotted position and engage the index and lift the pen thereof out of contact with the chart. Thus the index requires no attention in substituting new charts for old ones and both hands of the operator are free and available for manipulating the charts.

It will be understood that all of the features of the invention described herein need not necessarily be employed conjointly since some of them may be used separately to advantage. It will also be understood that the embodiment of the invention shown herein is selected for purposes of illustration merely and is susceptible of various modifications within the scope of the appended claims.

What I claim as new and desire to secure by Letters Patent is:

1. In a device of the class described, the combination of an index; responsive means for controlling the same; a casing for said responsive means; a plug entered in a wall of said casing and having an arm for supporting said responsive means; means for conducting fluid pressures to said responsive means and casing including a duct in said arm; and means to transmit movement from said responsive means through said plug to said index.

2. In a device of the class described, the combination of an index; responsive means for controlling the same; a casing for said responsive means; a plug entered in a wall of said casing; an arm projecting from said plug for supporting said responsive means; means to conduct fluid pressures to said responsive means and casing including a duct in said arm; means for transmitting movement from said responsive means to said index including a shaft and its bearing projecting through said plug; and a tube leading from one end of said bearing through said plug for equalizing the pressure on the opposite ends of said shaft.

3. In a device of the class described, the combination of an index; responsive means for controlling the same; a casing for said responsive means; a plug entered in a wall of said casing; a bearing carried by said plug; a shaft in said bearing; means connecting said shaft to said responsive means; and conduit means extending from said bearing through said plug for equalizing the pressure on the opposite ends of said shaft.

4. In a device of the class described, the combination of an index; responsive means for controlling the same; a casing for said responsive means; means to conduct fluid pressures to said responsive means and casing; and means automatically tending to equalize said pressures on a predetermined difference between them, including means containing a fluid column of an inherent pressure equal to said predetermined difference.

5. In a device of the class described, the combination of an index; responsive means for governing the same; means independently to conduct pressures to said responsive means; and means for automatically tending to equalize said pressures when their difference attains a predetermined amount including a casing having two liquid containing chambers; a pipe extending above the liquid in one and beneath the liquid in the other; means to conduct one of said pressures to one of said chambers; and means to conduct said other pressure to both of said chambers including a tube containing a liquid column of a length proportionate to said predetermined difference.

6. In a device of the class described, the combination of an index; responsive means for governing the same; means to conduct a plurality of pressures to said responsive means; and means for automatically tending to equalize said pressures on their exceeding a predetermined difference including a casing divided into an upper and a lower chamber; a pipe conveying one of said pressures to one of said chambers; pipes conveying said other pressure to both of said chambers; and a pipe connecting said chambers having one end submerged beneath liquid in the lower chamber and its other end above the surface of liquid in the upper chamber.

7. In a device of the class described, the combination of an index; responsive means for governing the same; a casing containing said responsive means; high and low pressure ducts for conducting pressures to said responsive means and casing; and means for automatically tending to equalize said pressures on their attaining a predetermined difference including a casing divided into two chambers, one containing a liquid deeper than the other; pipes communicating with said high pressure duct, one extending a distance beneath the surface of the deeper liquid proportional to said predetermined pressure difference and the other leading into the chamber containing the shallower liquid; a pipe connecting the low pressure duct with the deep liquid chamber; and a pipe connecting said chambers and having one end submerged beneath the shallow liquid and the other end projecting above the level of the deeper liquid.

8. In a device of the class described, the combination of an index; responsive means; a casing for the latter; an element coöperating with a wall of said casing; a fluid conducting arm projecting from said element for supporting said responsive means; and means to transmit movement from said responsive means through said element to said index.

9. In a device of the class described, the combination of an index; responsive means for controlling the same; means for subjecting said responsive means to differential pressures; and means including pressure responsive liquid means for automatically tending to equalize said pressures when the differential pressure reaches a predetermined amount.

10. In a device of the class described, the combination of an index; responsive means for controlling the same; and means for subjecting said responsive means to differential pressures including high and low pressure ducts, and means connecting said ducts containing a pressure responsive liquid for automatically releasing the differential pressure to tend to equalize the pressures in said ducts when the differential pressure reaches a predetermined limit.

11. In a device of the class described, the combination of an index; responsive means for controlling the same; and means for subjecting said responsive means to differential pressures including high and low pressure ducts, means tending to equalize the pressures including means communicating with said ducts and containing a pressure responsive liquid of a sealing depth proportionate to a predetermined differential pressure.

12. In a device of the class described, the combination of an index; responsive means for controlling the same; means for subjecting said responsive means to differential pressures; and means for automatically tending to equalize said pressures including a pressure responsive liquid having provision permitting the escape of the pressure fluid through said liquid to equalize the pressures when the differential pressure reaches a predetermined limit.

13. In a device of the class described, the combination of an index; responsive means for controlling the same; means for subjecting said responsive means to differential pressures; and pressure responsive liquid means having provision permitting said pressures to tend to become equalized immediately on their reaching a predetermined difference.

In testimony whereof I have signed my name to this specification in the presence of two subscribing witnesses.

EDGAR H. BRISTOL.

Witnesses:
HENRY T. WILLIAMS,
LOUIS A. JONES.